Figure 1:
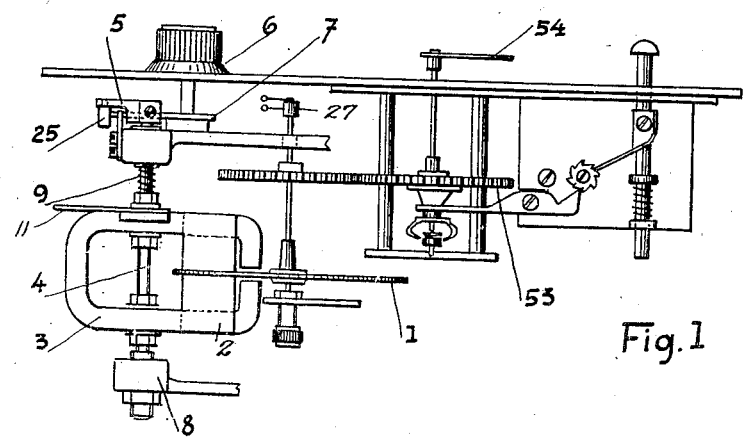

Feb. 16, 1937.  E. REICH ET AL  2,071,217
CALIBRATING METER HAVING A PLURALITY OF CONSTANTS
Filed July 6, 1935

Inventors
Ernest Reich
Franz Zipernovszky
By
E. F. Wenderoth
Atty

Patented Feb. 16, 1937

2,071,217

UNITED STATES PATENT OFFICE 2,071,217

CALIBRATING METER HAVING A PLURALITY OF CONSTANTS

Ernest Reich and Franz Zipernovszky, Budapest, Hungary

Application July 6, 1935, Serial No. 30,200
In Hungary July 7, 1934

3 Claims. (Cl. 171—34)

It is a drawback of most of the known types of checking or calibrating meters, that their constant, which equals the number of revolutions per hectowatt-hour, differs from the constant of the standard meters to be checked or calibrated. In consequence of this fact checking requires cumbersome calculations.

The checking meter according to the invention possesses, within certain limits, any desired number of constants. For the production of the various constants, i. e. of the various numbers of revolutions per hectowatt-hour, it is proposed, according to the invention, to employ, for influencing the numbers of revolution of the meter, a removable brake magnet or a plurality of removable brake magnets acting on the usual, or on a special brake disc of the meter. It is possible to read the displacement of the said brake magnet or magnets i. e. the corresponding constant on a scale. A varying brake effect is obtained, with this arrangement, on the brake disc of the meter by the deflection or radial displacement of the magnet.

In view of the fact, that the brake effect of the magnet is not proportionate to the angle of deflection, but varies according to a curve of approximately hyperbolic shape, the brake magnet is deflected or displaced by means of a curved path. Preferably this is done by means of an eccentric, whereby it becomes possible, by giving a suitable shape to the curved surface, to obtain a proportionate scale for reading the constants. Accordingly the lever effecting the deflection of the magnet is preferably supported on an eccentric, the shaft of which carries a turning button. By influencing the number of revolutions of the meter in this manner the error curve of the meter becomes improved, particularly if an accessory brake magnet or brake disc is provided. Such an arrangement makes it possible to transform a meter of normal number of revolution into one having a lower number of revolutions (e. g. to transform a meter of 3000 revolutions into one of 1800 revolutions).

It being possible in each case to adjust the constant of the calibrating meter so as to be identical with the constant of the meter to be calibrated, it is sufficient, when effecting calibration, to observe ten or twenty revolutions on the meter to be calibrated (checked), whereupon the error, expressed as a percentage, can be read off in a direct manner from the counter-scale of the calibrating meter.

The drawing illustrates by way of example the apparatus according to the invention.

Figure 2:
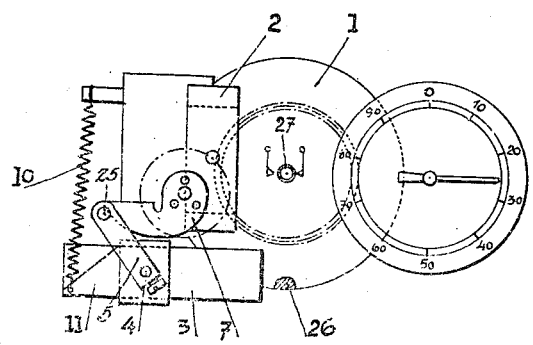

In the case of the embodiment illustrated in Figs. 1 and 2 in side elevation, and in plan view with lid removed, respectively, the number of revolutions of the meter is influenced by an accessory brake magnet.

The brake disc 1 of the meter (Figs. 1—2) is braked in the known manner by the fixed magnet 2. In order to increase the braking effect and thereby reduce the constant of the meter, a movable brake magnet acting either on the usual brake disc or on a special brake disc of the meter is provided. In the example shown, 3 is the movable brake magnet pivotable around shaft 4. The brake magnet 3 is displaced by a curved surface, e. g. by the eccentric 7 which can be deflected by means of the turning button 6, such displacement being effected through the lever arm 5 supported against the said eccentric by means of the pin 25 and acting on the upper end of the magnet shaft 4.

The eccentric 7, the periphery of which follows the curvature shown on Fig. 2 is so designed that at identical loads of the meter proportionate increases of the braking effect, i. e. proportionate diminutions of speed should correspond to identical angular deflections. In order to enable the position of the magnet 3 relatively to the brake disc 1 to be assured in the vertical direction, magnet 3 is pressed by spring 9 with a constant pressure into the adjustable step bearing 8.

In order to enable magnet 3 to follow the curvature of the eccentric 7 without any loose play, a spring 10 is provided, one end of which is secured to a fixed point, while its other end acts on the strap 11 (Fig. 2), by which strap the lever arm 5 is permanently pressed with a certain pressure against the eccentric 7. The position of the latter i. e. the corresponding constant can be read off the scale, not shown on the drawing, arranged in front of the turning button 6.

In case the constants of the meter can be varied in a continuous manner between the limits of 3000 and 1800 revolutions, it will be possible, of course, not only to check meters, the constant of which lies between the limits stated, but also to check meters the constant of which is a whole-number multiple or a whole-number quotient of the figures between 1800 and 3000. If it is desired to calibrate or check a meter with a constant of say 1000, the constant of the calibrating or checking meter is selected at the figure of 2000. In this case the checking meter performs two revolutions while a single revolution of the meter to be checked has been observed.

For the purpose of reading off the percentage of error in a direct manner according to Figs. 1—2 the following method is proposed:

With the disc of the meter, or with the shaft of the said disc, there is connected, in any desired manner, a counter mechanism 53 known per se, the pointer 54 of which performs, during each revolution of the disc, a complete revolution over a scale divided into, say, 100 divisions.

Calibration is effected with the aid of this meter in the following manner: The meter to be calibrated and the calibrating meter are put in circuit in the regular manner, whereupon both meters will run at the speed corresponding to the load. Let us, for the sake of simplicity, call the calibrating meter I and the meter to be calibrated II.

Meter I is adjusted to the constant shown on the name-plate of meter II, say 1000, and as soon as the red mark on the disc of meter II becomes visible, the counter mechanism is connected in the known manner with the shaft of the meter I by pressing down the button. After observing ten revolutions, the button on meter I is again pressed in the known manner, whereupon the pointer stops. If, for instance, it stops at the scale position 28 on the counter mechanism situated to the right of zero, this means that meter I is advancing 2.8% relatively to meter II, that is to say meter II is lagging behind by 2.8%. Thus the pointer of meter I will give the error limit in a direct manner in the form of a percentage.

What we claim is:—

1. A calibrating meter having a plurality of constants, comprising a brake disc, at least one brake magnet movable from the exterior, an eccentric determining a curved path through which the said magnet can be moved, the curvature of the said eccentric determining a proportional scale, and a pointer connected with the said magnet for reading off the constants on said scale, and adapted to be set to a desired constant.

2. A calibrating meter having a plurality of constants, comprising a brake disc, a fixed magnet for braking said disc, an auxiliary magnet movable from the exterior for acting in variable manner on said brake disc, an eccentric rotatable from the exterior, a deflecting lever arm adjacent to said eccentric and connected with said auxiliary magnet, the eccentric being designed to move said auxiliary magnet through a curved path of predetermined curvature, determining a proportional scale for reading off the constants, and a pointer connected with the auxiliary magnet for movement across said scale and adapted to be set to a desired constant.

3. A meter according to claim 2, and including an adjustable step bearing for the auxiliary magnet, and a spring urging said auxiliary magnet into said step bearing to ensure constant pressure of the auxiliary magnet on said step bearing.

ERNEST REICH.
FRANZ ZIPERNOVSZKY.